(12) United States Patent
Fargo et al.

(10) Patent No.: US 9,214,839 B2
(45) Date of Patent: Dec. 15, 2015

(54) THREE-PHASE DYNAMOELECTRIC MACHINES AND STATORS WITH PHASE WINDINGS FORMED OF DIFFERENT CONDUCTOR MATERIAL(S)

(75) Inventors: Vincent P. Fargo, St. Charles, MO (US); Pingshan Cao, Suzhou (CN); ShiXing Liu, Suzhou (CN); Pu Chen, Suzhou (CN)

(73) Assignee: EMERSON ELECTRIC CO., St. Louis, MO (US)

( * ) Notice: Subject to any disclaimer, the term of this patent is extended or adjusted under 35 U.S.C. 154(b) by 622 days.

(21) Appl. No.: 13/476,568

(22) Filed: May 21, 2012

(65) Prior Publication Data

US 2013/0043759 A1 Feb. 21, 2013

(30) Foreign Application Priority Data

Aug. 19, 2011 (CN) .................. 2011 1 02401915
Aug. 19, 2011 (CN) .................. 2011 2 03050502 U

(51) Int. Cl.
*H02K 3/02* (2006.01)
*H02K 3/28* (2006.01)

(52) U.S. Cl.
CPC ... *H02K 3/28* (2013.01); *H02K 3/02* (2013.01)

(58) Field of Classification Search
CPC .................................. H02K 3/02; H02K 3/28
USPC .................................. 310/179, 180, 184, 198
IPC ........................................................ H02K 3/02
See application file for complete search history.

(56) References Cited

U.S. PATENT DOCUMENTS

| | | | |
|---|---|---|---|
| 2,860,296 A | 11/1958 | Mollenberg | |
| 3,421,034 A | 1/1969 | Hershberger | |
| 3,450,338 A | 6/1969 | Huttenlocher | |
| 3,488,569 A | 1/1970 | Allendorph et al. | |
| 4,100,444 A * | 7/1978 | Boyd, Jr. | 310/184 |
| 5,065,305 A * | 11/1991 | Rich | 363/150 |
| 6,275,405 B1* | 8/2001 | Pernyeszi | 363/154 |
| 7,034,426 B2* | 4/2006 | Goche | 310/184 |
| 7,709,992 B2 | 5/2010 | Hussey et al. | |
| 7,772,737 B1* | 8/2010 | Fakonas | 310/198 |
| 8,148,870 B2 | 4/2012 | Iki et al. | |
| 8,222,788 B2 | 7/2012 | Rose | |
| 2005/0073207 A1* | 4/2005 | Goche | 310/184 |
| 2009/0189561 A1* | 7/2009 | Patel et al. | 318/806 |
| 2010/0213783 A1* | 8/2010 | Fakonas | 310/198 |

(Continued)

FOREIGN PATENT DOCUMENTS

| | | |
|---|---|---|
| GB | 1417014 | 12/1975 |
| JP | 2010-183788 | 8/2010 |

(Continued)

OTHER PUBLICATIONS

Hyper Physics, "Table of Resistivity", Electricity and Magnetism, 2014.*

*Primary Examiner* — John K Kim
(74) *Attorney, Agent, or Firm* — Harness, Dickey & Pierce, P.L.C.

(57) ABSTRACT

A stator for a polyphase dynamoelectric machine includes a stator core and windings positioned about the stator core. The windings include at least a first phase winding and a second phase winding. The first phase winding is formed of at least one electrical conductor material that is not present in the second phase winding.

15 Claims, 4 Drawing Sheets

(56) References Cited

U.S. PATENT DOCUMENTS

2010/0329906 A1 12/2010 Jung et al.
2011/0033326 A1 2/2011 Cao et al.
2013/0043759 A1* 2/2013 Fargo et al. .................. 310/184

FOREIGN PATENT DOCUMENTS

| | | |
|---|---|---|
| WO | 2008/055408 | 5/2008 |
| WO | 2010/098947 | 9/2010 |

* cited by examiner

THREE-PHASE DYNAMOELECTRIC MACHINES AND STATORS WITH PHASE WINDINGS FORMED OF DIFFERENT CONDUCTOR MATERIAL(S)

CROSS-REFERENCE TO RELATED APPLICATIONS

This application claims the benefit of Chinese Patent of Invention Application No. 201110240191.5 filed Aug. 19, 2011 and Chinese Utility Model Application No. 201120305050.2 filed Aug. 19, 2011, the entire disclosures of which are incorporated herein by reference.

FIELD

The present disclosure relates to polyphase dynamoelectric machines and stators with phase windings formed of one or more different electrical conductor materials.

BACKGROUND

This section provides background information related to the present disclosure which is not necessarily prior art.

Dynamoelectric machines such as electric motors and generators convert electric energy into mechanical energy, or vice versa.

Electric motors can be classified into two types: single-phase motors and polyphase motors. Single phase motors are driven by a single phase AC power source, whereas polyphase motors are driven by a polyphase AC power source, which is typically a three-phase AC power source. For purposes of this disclosure, a motor driven by a single phase AC power source is a single-phase motor, even if the motor includes multiple windings such as a main winding and an auxiliary/start winding.

Polyphase motors and generators have multiple (typically three) phase windings. Conventionally, the phase windings were formed of copper (including copper alloys). More recently, the phase windings have been formed of aluminum (including aluminum alloys) to reduce the cost of polyphase motors. This is due to the relatively higher cost of copper as compared to aluminum. It is also known to form each phase winding of both copper and aluminum to achieve desired performance characteristics while minimizing the amount of copper used in each phase winding. Again, this is done to reduce the overall cost of the motor, due to the relatively higher cost of copper as compared to aluminum.

SUMMARY

This section provides a general summary of the disclosure, and is not a comprehensive disclosure of its full scope or all of its features.

According to one aspect of the present disclosure, a stator for a polyphase dynamoelectric machine includes a stator core and windings positioned about the stator core. The windings include at least a first phase winding and a second phase winding. The first phase winding is formed of at least one electrical conductor material that is not present in the second phase winding.

Further aspects and areas of applicability will become apparent from the description provided herein. The description and specific examples provided below are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
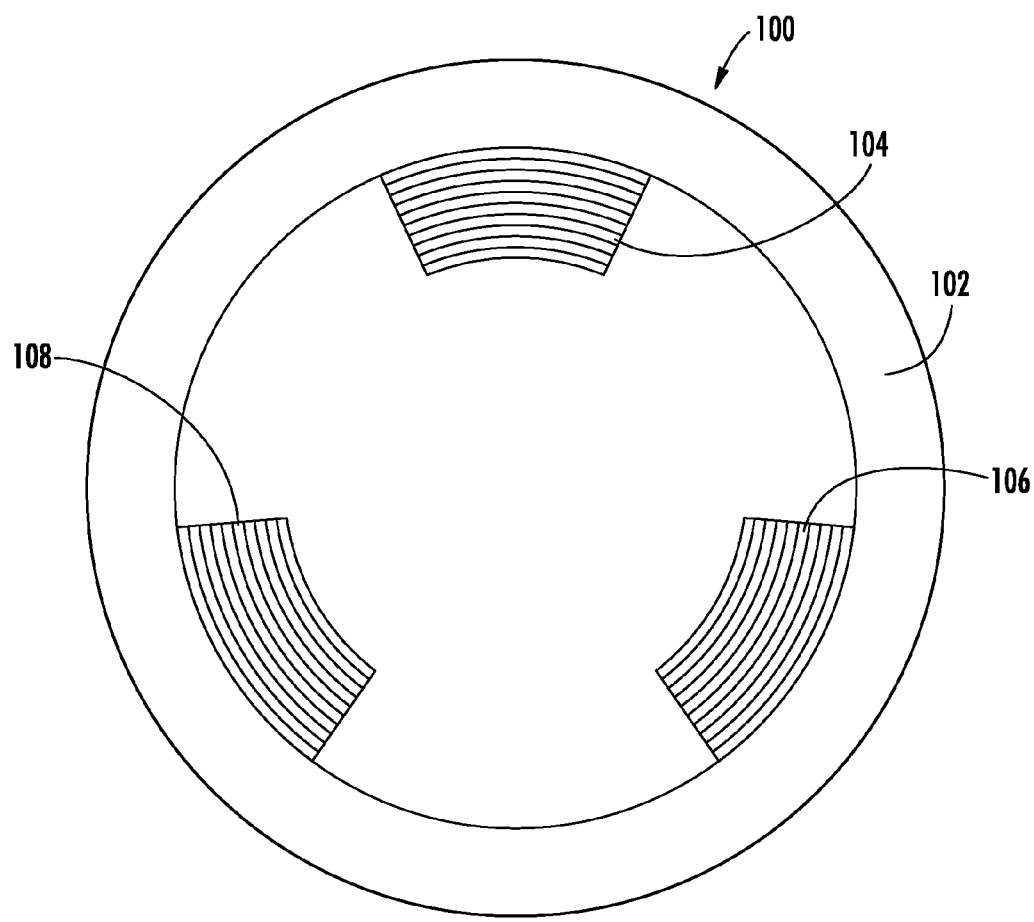
FIG. 1 is a plan view of a stator for a polyphase dynamoelectric machine according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A stator for a three-phase dynamoelectric machine according to one example embodiment of the present disclosure is illustrated in FIG. 1 and indicated generally by reference number 100. As shown in FIG. 1, the stator 100 includes a stator core 102 and several phase windings positioned about the stator core 102, including a first phase winding 104, a second phase winding 106 and a third phase winding 108. The first phase winding 104 is formed of at least one electrical conductor material that is not present in the second phase winding 106. For example, the first phase winding 104 may include copper, and the second phase winding 106 may be formed of one or more other electrical conductor materials that do not include copper.

By employing an electrical conductor material in the first phase winding that is not present in the second phase winding, the stator 100—or a dynamoelectric machine incorporating the stator 100—may have a desired combination of attributes (such as efficiency and material cost) that may not be attainable with a conventional stator that employs the same electrical conductor material(s) in each phase winding.

In the example embodiment of FIG. 1, the stator core 102 is illustrated with only three salient poles. In other embodiments, additional salient poles may be employed (and preferably are employed). In that event, each phase winding 104-108 may include two or more coils wound around two or more salient poles. Further, the electrical conductor material(s) employed for a particular phase winding may depend on the number and/or position of its coils about the stator coil 102. Each coil includes one or more turns, and the number of turns for each coil may be the same as or different than other coils.

Figure 2A:
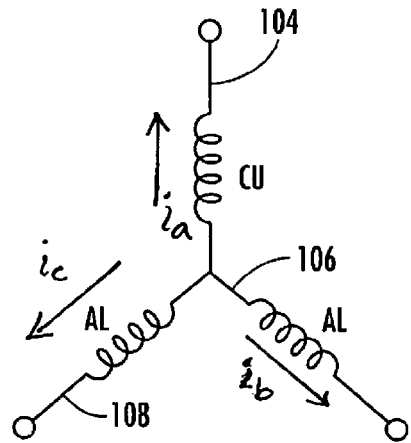
FIGS. 2A and 2B are circuit diagrams for example stators having only one electrical conductor per phase.
Figure 2B:
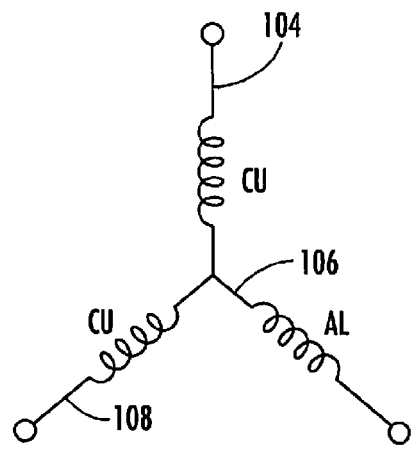

In some embodiments, the phase windings 104-108 each include only one electrical conductor. For example, and as shown in FIG. 2A, the first phase winding 104 may be formed of only one electrical conductor that includes copper (e.g., a copper wire), while the second phase winding 106 and the third phase winding 108 may each be formed of only one electrical conductor that includes aluminum (e.g., an aluminum wire). FIG. 2B illustrates another example configuration, where the first phase winding 104 and the third phase winding 108 may each be formed of only one electrical conductor that includes copper, while the second phase winding 106 may be formed of only one electrical conductor that includes aluminum. In FIGS. 2A and 2B, the first phase winding 104 includes at least one electrical conductor material (i.e., copper) that is not present in the second phase winding 106.

Figure 3A:
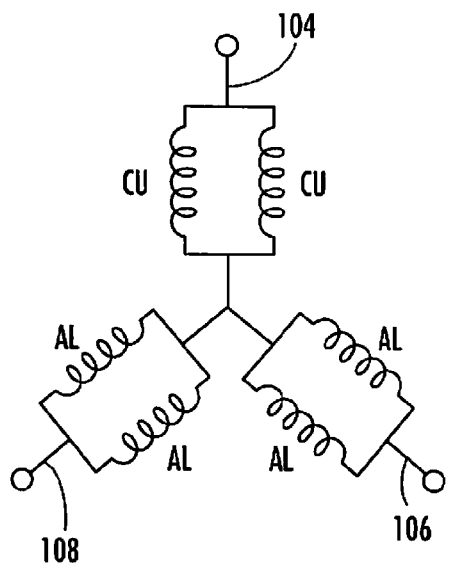
FIGS. 3A and 3B are circuit diagrams for example stators having the same number of electrical conductors per phase.
Figure 3B:
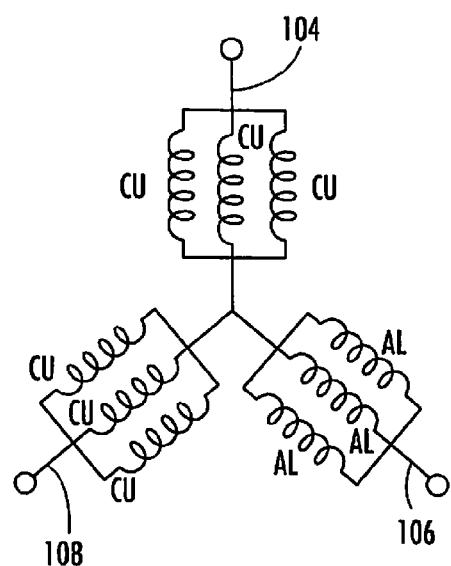

Alternatively, one or more of the phase windings 104-108 may include two or more electrical conductors connected in parallel. Further, the first phase winding 104 may have the same number of electrical conductors as the second and third phase winding 106, 108. For example, FIG. 3A illustrates an example embodiment in which each phase winding 104-108 includes two electrical conductors connected in parallel. In particular, the first phase winding 104 is formed of two electrical conductors that include copper, while the second and third phase windings 106, 108 are each formed of two electrical conductors that include aluminum. Similarly, in the example shown in FIG. 3B, each phase winding 104-108 includes three electrical conductors connected in parallel. In particular, the first and third phase windings 104, 108 are each formed of three electrical conductors that include copper, while the second phase winding 106 is formed of three electrical conductors that include aluminum. In FIGS. 3A and 3B, the first phase winding 104 includes at least one electrical conductor material (i.e., copper) that is not present in the second phase winding 106.

In the example embodiments shown in FIGS. 2 and 3, the first phase winding 104 is formed exclusively with a first electrical conductor material (e.g., copper wire), and the second phase winding 106 is formed exclusively with a second electrical conductor material that is different than the first electrical conductor material (e.g., aluminum wire).

Figure 4A:
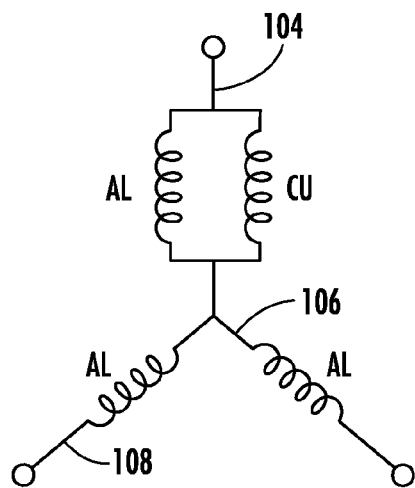
FIGS. 4A-4C are circuit diagrams for example stators having different numbers of electrical conductors per phase.
Figure 4B:
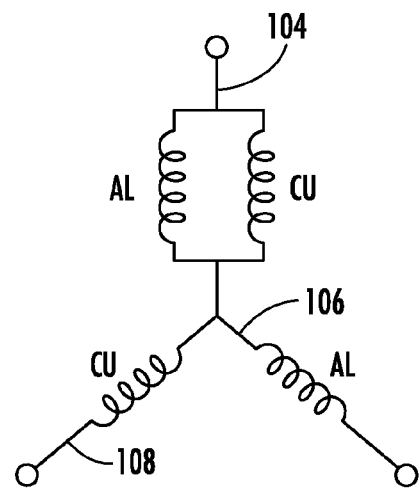
Figure 4C:
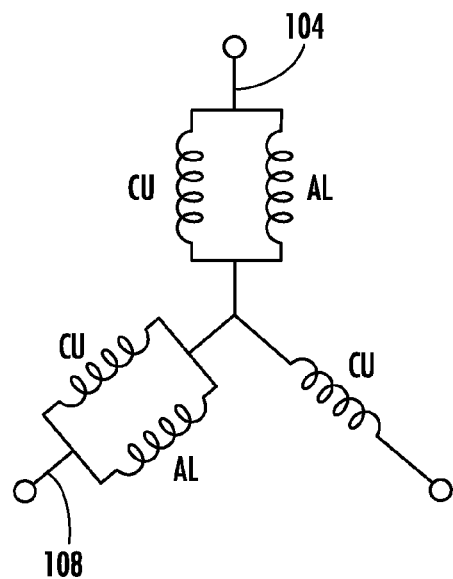

FIGS. 4A-4C illustrate additional example embodiments in which the first phase winding 104 has a different number of electrical conductors than the second or third phase winding 106, 108. In the example embodiment of FIG. 4A, the first phase winding 104 is formed of two electrical conductors connected in parallel, including a first electrical conductor that includes copper and a second electrical conductor that includes aluminum. In contrast, the second and third phase windings 106, 108 are each formed of a single electrical conductor that includes aluminum. FIG. 4B illustrates another example embodiment having the same configuration as the example of FIG. 4A, except the third phase winding 108 in FIG. 4B is formed of a conductor that includes aluminum rather than copper. In the example embodiment of FIG. 4C, the first and third phase windings 104, 108 are each formed of two electrical conductors connected in parallel, including a first electrical conductor that includes copper and a second electrical conductor that includes aluminum. In contrast, the second phase winding 106 is formed of a single electrical conductor that includes copper. In FIGS. 4A-4C, the first phase winding 104 includes at least one electrical conductor material (i.e., copper in FIGS. 4A and 4B, and aluminum in FIG. 4C) that is not present in the second phase winding 106.

The third phase winding 108 (when employed) may have the same configuration (i.e., the same number and type of electrical conductors) as the first phase winding 104 or the second phase winding 106. Alternatively, the third phase winding 108 may have a unique configuration that is different than the first phase winding 104 and the second phase winding 106. FIG. 4B is one example of a third phase winding 108 having a unique configuration.

In any given embodiment, the size or wire gauge of each electrical conductor may be the same as or different than the size or wire gauge of other electrical conductors in the same phase winding (if applicable) or the other phase windings. Generally, the size or wire gauge of any particular conductor may depend on the desired resistance and/or impedance of the conductor and its associated phase winding, the position of the conductor on the stator core, the "stack height" of the stacked stator laminations (when applicable), the design of the stator laminations (when employed), the size of the machine, the intended application and/or other considerations. In many embodiments, the size of each electrical conductor will range between about 19 AWG and about 14 AWG.

With further reference to FIG. 1, the stator core 102 may be formed in any suitable manner using any suitable materials. For example, the stator core 102 may employ a segmented or non-segmented construction, and may include multiple laminations stacked together. The laminations may be formed of steel, cast iron, aluminum, or other suitable materials.

The dimensions of the stator 100 may be selected as appropriate for any given application. In some embodiments, the stator 100 has a diameter between about 5.3 inches (13.5 cm) and about 7.1 inches (18 cm). In one particular embodiment, the stator 100 has a diameter of about 6.3 inches (16 cm).

While the example embodiments described above employ electrical conductors including copper or aluminum, it should be understood that other known electrical conductor materials may be employed, including silver, gold, calcium, beryllium, tungsten, etc. Further, the teachings of this disclosure may also be applied using future (i.e., presently unknown) electrical conductor materials.

In the example embodiments shown in FIGS. 2-4, the phase windings 104-108 are connected in a Wye configuration. Alternatively, the phase windings can be connected in a Delta configuration.

It should also be understood that while FIGS. 1-4 illustrate stators for three phase machines, the teachings of this disclosure are applicable to any polyphase machine having more or less phase windings, including stators having only two phase windings (e.g., for two-phase motors).

In any given embodiment of this disclosure, the electrical resistance of the first phase winding may be substantially different than the electrical resistance of the second phase winding and/or the electrical resistance of the third phase winding. For example, the resistance of the first phase winding may differ from the resistance of the second phase winding by more than ten percent (10%). In other words, the resistance of the first phase winding may be less than ninety percent (90%), or greater than one hundred ten percent (110%), of the resistance of the second phase winding. Preferably, however, the electrical impedance of the first phase winding will be substantially the same as (e.g., within ten percent (10%) of) the electrical impedance of the second phase winding and/or the electrical impedance of the third phase winding. In other words, the impedance of the first phase winding is preferably equal to the impedance of the second phase winding or the impedance of the third phase winding, plus or minus ten percent (±10%). As a result, the current imbalance between any two phases will be no more than ten percent (10%) when the stator is used, for example, in a motor energized by a balanced power source.

Figure 5:
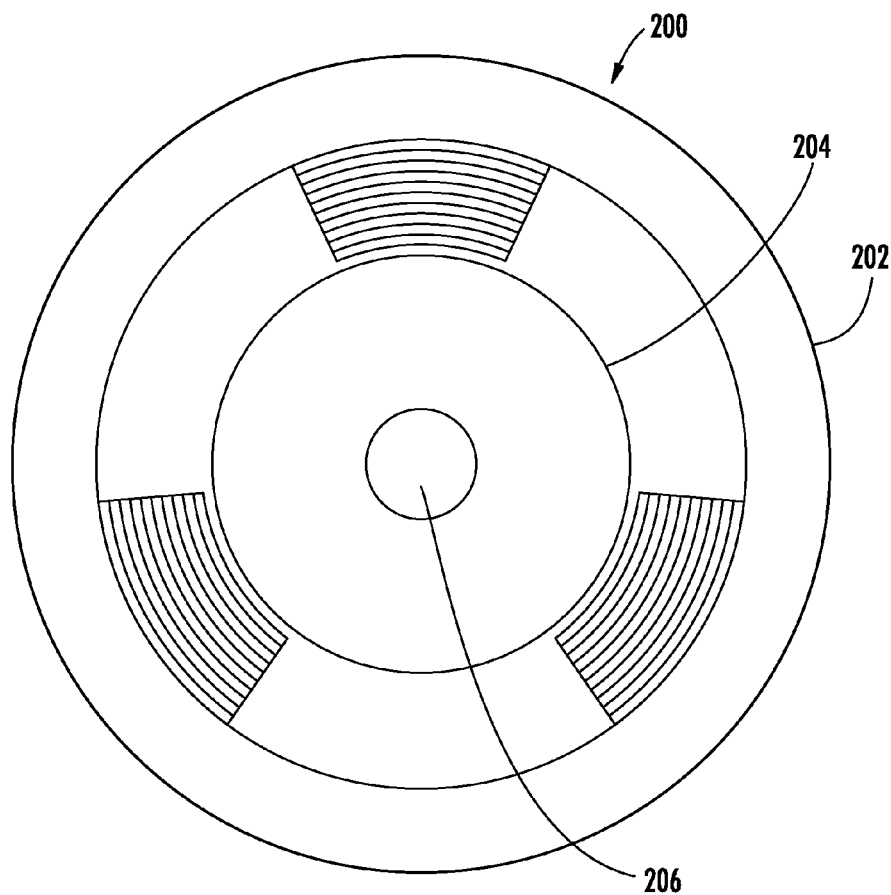
FIG. 5 is a plan view of a polyphase motor according to another example embodiment of the present disclosure.

FIG. 5 illustrates a polyphase electric motor 200 according to another example embodiment of this disclosure. The electric motor 200 includes a stator 202 and a rotor 204 coupled to a motor shaft 206. The rotor 204 may have any suitable configuration. For example, the rotor 204 may employ a squirrel cage, slip ring, solid core, or other suitable construction. Additionally, the rotor 204 may be surrounded by the stator 202 as shown in FIG. 5. Alternatively, the rotor may be configured to extend around the stator (i.e., sometimes referred to as an "outer rotor" or "inside out" motor).

The stator 202 may employ any of the configurations mentioned above and/or illustrated in FIGS. 1-4. Preferably, the stator includes three phase windings each having an electrical impedance that is within ten percent (10%) of the electrical impedances of the other phase windings. As a result, the current imbalance between any two phase windings will be no more than ten percent (10%) when the polyphase motor is energized with a balanced power source.

In one presently preferred embodiment, the polyphase motor 200 of FIG. 5 includes a stator 202 having the winding configuration shown in FIG. 2A. Based on fixed rotor performance measurements, the line-to-line inductance between the first phase winding 104 and the second phase winding 106 is 56.4 mH, the line-to-line inductance between the first phase winding 104 and the third phase winding 108 is 62.7 mH, and the line-to-line inductance between the second phase winding 106 and the third phase winding 108 is 69.2 mH. Therefore, the average line-to-line inductance is 62.8 mH. Additionally, the maximum deviation between any two of the line-to-line inductances is only about ten percent (10%), even though the first phase winding 104 is formed from a different material (i.e., copper) than the second and third phase windings 106, 108. Further, the deviation between the line-to-line inductances may be attributable to an uneven air gap within the motor, rather than to the different electrical conductor materials.

To calculate the average phase inductance, the average line-to-line inductance can be used in formula (1) below, where $L_{ph}$ is the average phase inductance and $L_{line}$ is the average line-to-line inductance.

$$L_{ph} = L_{line}/1.5 \qquad (1)$$

Thus, for the particular embodiment under discussion, the average phase inductance is 42 mH.

The phase reactance can be calculated by using formula (2) below, where X is the phase reactance, f is the operating frequency and $L_{ph}$ is the average phase inductance (calculated above).

$$X = 2*\pi*f*L_{ph} \qquad (2)$$

Assuming an operating frequency of 50 Hz., the reactance for each phase is 13.2 ohms.

The impedance for each phase can be calculated using formula (3) below, where Z is the phase impedance, R is the phase resistance and X is the phase reactance.

$$Z = \sqrt{(R^2 + X^2)} \qquad (3)$$

In this exemplary embodiment, the second phase winding 106 and the third phase winding 108 (both formed of aluminum) each have a resistance of 1.727 ohms, while the first phase winding 104 (formed of copper) has a resistance of 1.146 ohms. Thus, the impedance for each aluminum phase winding is 13.31 ohms, while the impedance for the copper phase winding is 13.25 ohms.

Accordingly, even though the resistance of the first phase winding differs from the resistance of each of the second and third phase windings by more than thirty percent (30%), the impedance of the first phase winding 104 is about the same as the impedance of the second phase winding 106 and the third phase winding 108. Thus, the current through each phase winding will be about the same when the motor 200 is energized by a balanced power source, even though the first phase winding 104 is formed from a different material (i.e., copper) than the second and third phase windings 106, 108.

The teachings of this disclosure can be applied to a wide variety of polyphase motors and generators of various configurations (e.g., size, shape, horsepower, etc.), including induction motors, synchronous motors, etc. Such motors can be used in a wide variety of applications including pumps, fans, blowers, compressors, appliances, conveyor drives, electric vehicles, and any other polyphase motor applications.

Figure 6:
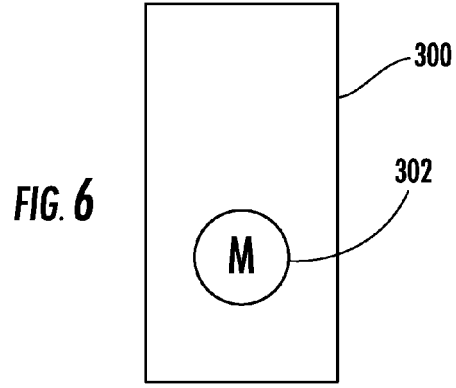
FIG. 6 is a block diagram of a compressor according to another example embodiment of this disclosure.

FIG. 6 illustrates a compressor 300 according to another example embodiment of this disclosure. As shown in FIG. 6, the compressor 300 includes a polyphase motor 302. The polyphase motor 302 includes a stator (not shown). The stator may employ any of the configurations mentioned above and/or illustrated in FIGS. 1-5. The compressor 300 is preferably a hermetically sealed scroll compressor. Alternatively, another suitable type of compressor, including reciprocating, rotary screw and rotary vane compressors, may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A stator for a three-phase dynamoelectric machine adapted to be driven by a three-phase AC power source, the stator comprising a stator core and windings positioned about the stator core, the windings including at least a first phase winding having a first terminal for coupling to a first phase of the three-phase AC power source, a second phase winding having a second terminal for coupling to a second phase of the three-phase AC power source, and a third phase winding having a third terminal for coupling to a third phase of the three-phase AC power source, the first phase winding, the second phase winding, and the third phase winding connected in a wye configuration or a delta configuration, each of the first phase winding, the second phase winding, and the third phase winding including one or more electrical conductors formed of a single electrical conductor material, and wherein the electrical conductor material of the first phase winding is different than the electrical conductor material of the second phase winding.

2. The stator of claim 1 wherein the at least one conductor material comprises copper.

3. The stator of claim 2 wherein the second phase winding comprises aluminum.

4. The stator of claim 3 wherein the first phase winding includes only one electrical conductor.

5. The stator of claim 3 wherein the first phase winding includes a first electrical conductor and a second electrical conductor connected in parallel with the first electrical conductor.

6. The stator of claim 5 wherein the first electrical conductor and the second electrical conductor each comprise copper.

7. The stator of claim 4 wherein the second phase winding includes only one electrical conductor.

8. The stator of claim 1 wherein the first phase winding has an impedance, the second phase winding has an impedance, and the impedance of the first phase winding is within ten percent (10%) of the impedance of the second phase winding.

9. The stator of claim 8 wherein the first phase winding has a resistance, the second phase winding has a resistance, and a difference between the resistance of the first phase winding and the resistance of the second phase winding is greater than ten percent (10%) of the resistance of the second phase winding.

10. The stator of claim 1 wherein the third phase winding comprises copper.

11. The stator of claim 1 wherein the third phase winding comprises aluminum.

12. The stator of claim 1 wherein the third phase winding includes only one electrical conductor.

13. A three-phase dynamoelectric machine comprising the stator of claim 1.

14. The three-phase dynamoelectric machine of claim 13 wherein the machine is a three-phase motor.

15. A hermetic compressor comprising the three-phase dynamoelectric machine of claim 14.

* * * * *